United States Patent [19]

Leanna

[11] Patent Number: 4,920,630

[45] Date of Patent: May 1, 1990

[54] METHOD OF MAKING PARTS FOR A MAGNETIC CYLINDER

[75] Inventor: Gregory D. Leanna, Appleton, Wis.

[73] Assignee: Integrated Design Corp., Green Bay, Wis.

[21] Appl. No.: 299,877

[22] Filed: Jan. 19, 1989

Related U.S. Application Data

[62] Division of Ser. No. 151,315, Feb. 1, 1988, Pat. No. 4,831,930.

[51] Int. Cl.[5] ........................ B21D 39/00; B23P 19/02

[52] U.S. Cl. ........................................ 29/521; 29/525; 29/125

[58] Field of Search ................. 29/446, 450, 407, 521, 29/522.1, 525, 125; 101/389.1

[56] References Cited

U.S. PATENT DOCUMENTS

| | | | |
|---|---|---|---|
| 3,097,598 | 7/1963 | Hotop et al. | 101/378 |
| 3,742,852 | 7/1973 | Leffler et al. | 101/378 |
| 4,676,161 | 6/1987 | Peekna | 101/378 |
| 4,811,474 | 3/1989 | Maucher et al. | 29/522.1 X |

*Primary Examiner*—Timothy V. Eley

*Attorney, Agent, or Firm*—Fuller, Puerner & Hohenfeldt

[57] ABSTRACT

A magnetic cylinder is formed by stacking ferromagnetic pole disks to which spacer rings are fastened. A circular array of tabs are pierced from the plane of the pole disks. the tabs are angulated relative to said plane and they diverge radially outwardly but their edges terminate on a circle concentric to the rim of the disk to provide a margin on which a concentric spacer ring is applied and is secured to the pole by pressing the tabs back toward the plane of the pole so they wedge tightly against the spacer ring. Permanent magnets are applied to the poles between adjacent pairs of tabs and they form parallel axially extending rows of magnets when the poles are stacked. At least one row is comprised of magnets which are stronger than the other to more forcefully hold down the edges of a die cutting plate of a printing plate which is wrapped around the magnetic cylinder.

4 Claims, 3 Drawing Sheets

METHOD OF MAKING PARTS FOR A MAGNETIC CYLINDER

This is a divisional of co-pending application Ser. No. 07/151,315 filed on 2/1/88 now U.S. Pat. No. 4,831,930.

BACKGROUND OF THE INVENTION

The invention disclosed herein pertains to a magnetic cylinder structure and a method of fabricating the cylinder.

Magnetic cylinders are used for holding thin flexible magnetizable etched plates, such as are used in printing presses or die cutting presses. The type of magnetic cylinder most commonly used at the present time is based on Hotop et al. U.S. Pat. No. 3,097,598. This type of magnetic cylinder comprises a series of uniformly spaced apart coaxial centrally apertured ferrous metal disks, called magnetic poles, having nonmagnetic spacer rings between them. The spaces defined between the poles are occupied by a circular array of permanent bar magnets. Construction of the cylinder involves making subassemblies by setting a nonmagnetic spacer ring on a pole disk in a jig and placing the magnets on the pole disk. These subassemblies are then stacked on a mandrel or the like and finally clamped together to form a cylinder. In a magnetic cylinder design that is currently widely used the inside diameters of the spacers and the pole disks are nominally but not exactly the same. There is, however, sufficient diametral clearance for the spacers and pole disks to make a slip fit onto the mandrel with little force being applied. Because, in practice, it is impossible to make the two internal diameters the same size, both inside diameters are made oversize by, perhaps, two thousandths of an inch to assure that the magnetic pole disks and the spacers will fit on the mandrel. If it were possible to make both diameters exactly equal, then the cylinder could be press fit on the mandrel. To compensate for the dimensional tolerance and hopefully prevent slight radial shifting of the disk and magnet subassemblies, epoxy resin is applied to them to fix them against radial shift and to hold the magnets in place. The periphery of the cylinder is usually ground and polished to a very smooth finish. Sometimes the cylinders are chromium plated. Even though the pole disks and spacers are bonded with epoxy resin, they sometimes yield radially when in use so concentricity is lost. The periphery of the cylinder takes on a corduroy appearance and the die plate deforms and can no longer cut elements out of a sheet properly. This is the harmful consequence of having needed relatively large inside diameter tolerances.

Assembling known types of magnetic cylinders is tedious and must be done with considerable care. The spacer and pole must be maintained concentric during bonding in which case specialized jigs may have to be used for performing the bonding operation. In prior art magnetic cylinder designs in current use wherein spacer rings are bonded to the poles with an adhesive such as an epoxy resin the bond is not stable and experience has shown that the parts have a tendency to shift or move in use, that is, when they are rotating at high speed or under high pressure in a printing or die cutting press. Radial slipping by a pole of as little as one ten-thousandth of an inch can make a die unusable for cutting.

A basic objective in magnetic cylinder design is to have the magnetic field strength maximized at the surface of the cylinder for exerting the strongest magnetic attraction on the flexible magnetizable printing or die cutting plate that is wrapped around the magnetic cylinder. The internal circumference of the bendable die plates is substantially equal to the external circumference of the magnetic cylinder in which case the edges of the plate butt or nearly butt against each other. Where the diameter of the magnetic cylinder is relatively small, such as about 3.5 inches or less, the die plate must be formed into a similar diameter such that high internal bending stresses are developed which tend to restore the stiff thin die plate to a flat condition. This causes the edges of the flexible plate to tend to peel away from the periphery of the cylinder. To mitigate this problem, manufacturers have tended to use magnets throughout the magnetic cylinder which have the highest available strength to assure that the magnetic attraction is strong enough to prevent any separation of the flexible plate from the magnetic cylinder in the region of the end edges of the flexible plates. The cost of magnets increases at an exponential rate with increased strength since the stronger magnets are composed of rare and sophisticated materials as compared to the weaker magnets.

SUMMARY OF THE INVENTION

An objective of the present invention is to provide a magnetic cylinder designed in such a way that its fabrication is markedly simplified as compared with prior methods so the usual high cost of the magnetic cylinders is reduced.

Another objective is to simplify forming the pole piece, spacer and magnet subassembly while also gaining an advantage in simplification of the cylinder assembly process.

Another objective is to provide a magnetic cylinder in which the majority of permanent magnets used are of a comparatively inexpensive but adequately strong type and a minority of the magnets are much stronger and more expensive but are only used where high attractive force is needed to hold down the edges of a die cutting or printing plate.

Briefly stated, the new magnetic cylinder is distinguished from prior art cylinders in one of several ways by using a new type of magnetic pole disk. Each of the pole disks has a circular array of punched out tabs which diverge from the face of the disk, in a direction away from the center of the disk and toward the circumference of the disk at an acute angle such that the tabs present their edges in a radially outward direction. The radially outer edges of the tabs lie on a common circle which has a diameter slightly less than the spacer rings so the spacer rings can be deposited on the poles in perfect concentricity. Then, all of the angulated tabs are pressed in a direction that would tend to restore them into the plane of the pole plate in which they are punched. This pressing operation causes the ends of the tabs to wedge tightly against the inside periphery of the spacer rings. As a result of pressing the tabs, the spacers are effectively bonded to the poles and the spacers are exactly concentric with the circular pole disks. The bar magnets are applied and attracted to the disk in the space between the circumferentially spaced apart tabs so the flat faces of the magnets lie against flat surfaces on the poles. The edges of the magnets can be pushed right up against the inside diameter or inside rim of the spacer rings.

A great reduction in the production cost of the cylinder and, hence, the sale price has also been accomplished in accordance with the invention by using only relatively low cost but sufficiently strong magnets for most of the magnets in the circular array of magnets on each pole but using at least one longitudinally extending row of the more expensive and stronger magnets on each of the pole pieces. The stronger magnets are aligned with each other along the periphery of the cylinder such that the edges of the flexible plate overlay the row or limited number of rows of exceptionally strong magnets. This assures that the edges of the sheet are held to the periphery of the cylinder without any space ever forming between them during high speed rotation of the cylinder.

An illustration of how the new cylinder is constructed and the new method of assembling it will now be discussed in greater detail in reference to the drawings.

DESCRIPTION OF A PREFERRED EMBODIMENT

Figure 1:
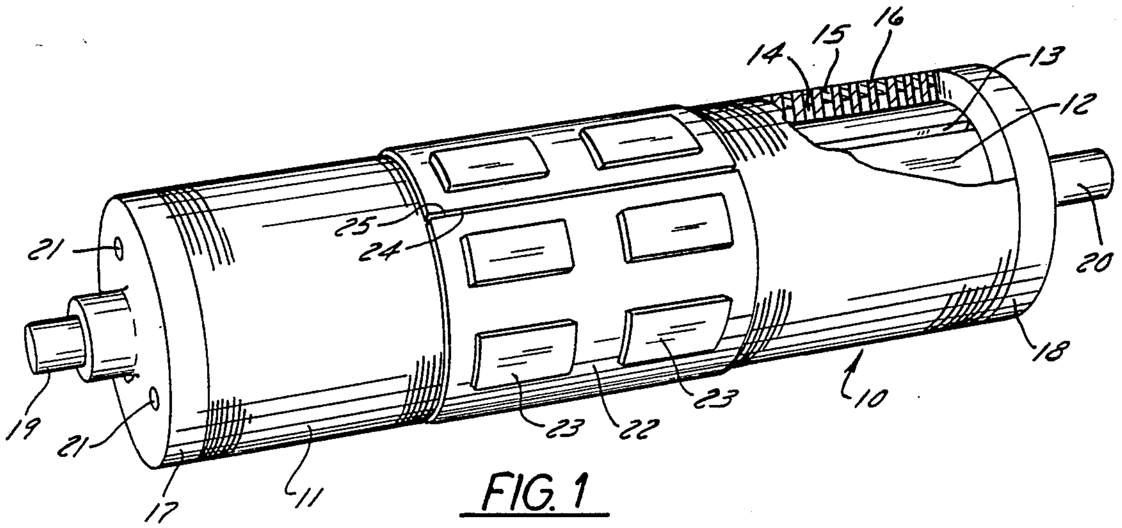
FIG. 1 is a side elevational view, partly in section, of a magnetic cylinder equipped with a flexible magnetizable plate having the elements for conducting an operation such as printing or die cutting.
Figure 2:
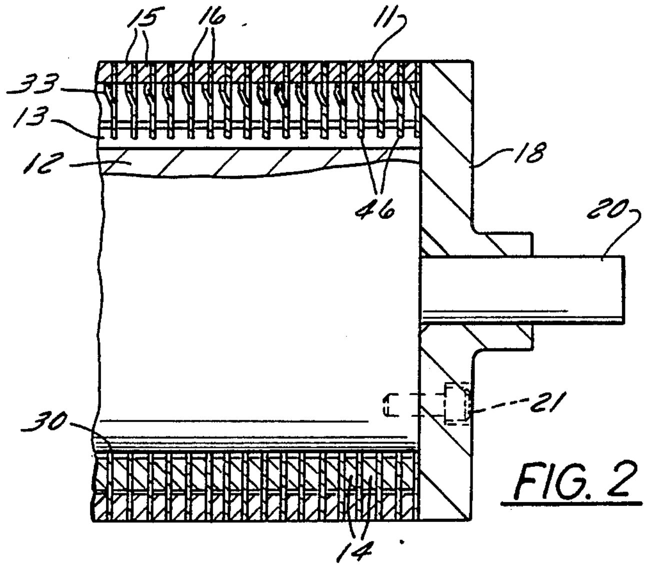
FIG. 2 is a partial vertical section of an end portion of the magnetic cylinder taken on a line corresponding with 2—2 in FIG. 6
Figure 3:
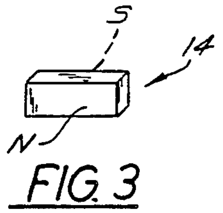
FIG. 3 is a perspective view of one of the magnets which are used in the illustrated embodiment of the new magnetic cylinder.

FIG. 1 shows one of the new magnetic cylinders 10 with a part broken away to reveal part of its internal construction. Maximum magnetic attractive force is developed at the periphery 11 of the cylinder. The magnetic components are mounted on a nonmagnetic core or shaft 12 in which there is a keyway 13 that assures the permanent magnets 14 will form axially aligned rows when the pole, spacer and magnet subassemblies are stacked to form a cylinder and assures that the parts can not rotate on the core. In FIG. 1, the spacer rings, hereafter called spacers, are identified by the numeral 15. The spacers 15 are preferably made of nonmagnetic stainless steel but brass, aluminum, polycarbonate resin, urethane, ceramic or other rigid nonmagnetic materials could be used. The magnetic pole disks, hereafter called poles, are designated in FIG. 1 by the reference numeral 16. The poles are made of a magnetically susceptible material such as cold-roll steel. Although the magnetic subassemblies can be held in compression in various ways, they are shown as being retained between end caps 17 and 18 from which stub shafts 19 and 20 project. The end caps can be held in compressive relation to the magnetic subassemblies by using recessed screws such as the one marked 21 in FIG. 2.

In FIG. 1, magnetic cylinder 10 is shown as being used for holding a magnetizable flexible substrate or plate 22 on which cutting dies 23 are formed. These dies can be chemically milled on the flexible magnetizable plate 22. The dies could be used to punch labels out of a printed web, for example. The cutting dies 23 may also be looked upon as components of an image plate in a case where the magnetic cylinder and the flexible plate are used in a printing press. The magnetizable flexible printing or cutting die plate 22 has end portions terminating in edges 24 and 25 which can abut or nearly abut when the plate is wrapped around the magnetic cylinder 10. As the diameter of the magnetic cylinder is made smaller, the diameter of the arcuately formed flexible plate necessarily is smaller which results in increased bending stress being developed in the plate. Hence, as cylinder diameter decreases, the plate edges 24 and 25 will have a greater tendency to separate or spring away from the cylinder. As mentioned earlier, the present invention provides an economical and facile way for holding down the edges of the plate 22 securely. The manner in which this is done will be discussed in greater detail later.

Figure 4:
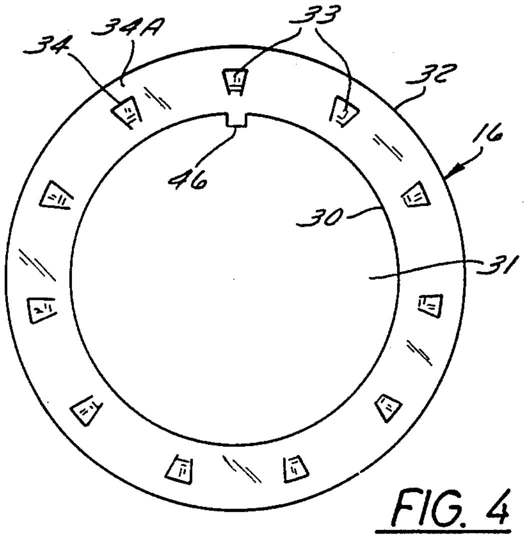
FIG. 4 is a plan view of a pole comprised of a centrally apertured disk of magnetizable material and showing the array of metallic tabs which are deflected from the plane of the disk and are used for bonding a spacer ring to the pole disk.
Figure 5:
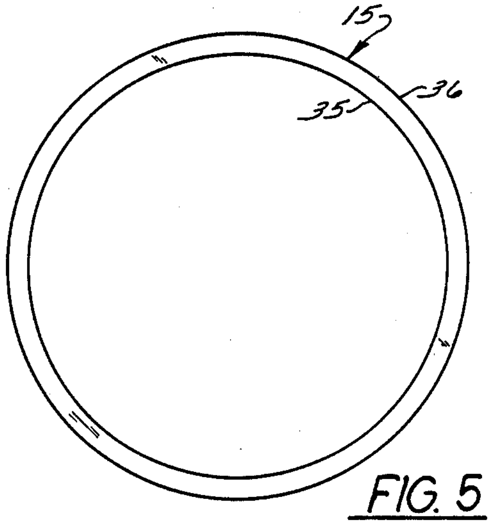
FIG. 5 is a plan view of a spacer ring composed of nonmagnetic material.
Figure 8:
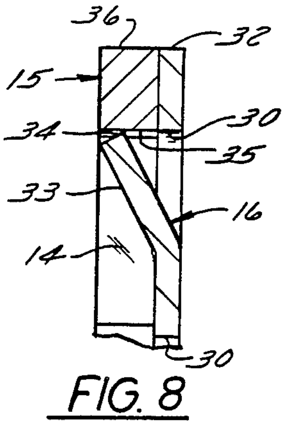
FIG. 8 is a section through part of a subassembly, such as is depicted in FIG. 7 but enlarged to show how the tabs on the poles are angulated for their free edges to lie on an imaginary circle with which the inside circumference of the spacer rings coincide.

Attention is now invited to FIG. 4 which shows one of the unique magnetizable material poles 16 constituting one of the replicated parts that is used to develop the magnetic cylinder assembly depicted in FIG. 1. The pole piece 16 in FIG. 4 is a disk having an inside circumference 30 defining a circular opening 31, and an outside circumference 32. The pole is a thin soft ferrous metal, such as cold-roll steel plate. By way of example and not limitation, in one actual embodiment the pole is 0.06 inch thick. The pole 16 is pierced in a way that causes a circular array of tabs 33 to be created. The edges 34 of the tabs are all equidistant from the periphery or circumference 32 of the pole which means all of the edges 34 lie on an imaginary circle that encompasses the tabs. Radially outwardly from the tab edges 34 and extending to the circumference 32 is a margin space 34A which is the area to which the spacer ring 15, shown in FIG. 5, will be attached to the pole. FIG. 8 provides a magnified view of a tab 33 at a time when the spacer 15 is simply deposited loosely on the pole 16. It should be noted in FIG. 8 that at this time the edge 34 of the tab 33 is just barely making contact with the inside rim 35 of the spacer. Note also that the radially outside rim 36 of the spacer is flush with outside rim 32 of pole 16. The tab 33 is deflected from the plane of the pole 16 and diverges radially outward from the plane of the pole. It will be evident that the tabs 33 are useful for centering the spacers in cases where it is necessary to hold the stainless steel or other nonmagnetic material spacer against the face of the pole where bonding by brazing or the like is used as well as where only the tabs are used to attach the spacers permanently to the poles.

Figure 9:
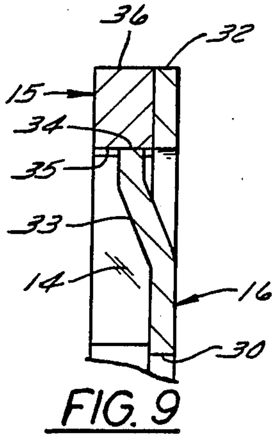
FIG. 9 is similar to FIG. 8 except that the tab has been pressed and deformed to create a wedging action on the spacer ring.

FIG. 9 illustrates the result of one of the first operations that is carried out to form a pole, spacer and magnet subassembly. Before the magnets 14 are installed or applied to the face of the poles, the poles are placed between locating stops 45 in a press which is symbolized in FIG. 11. In this press, the tabs 33 are deformed by pressing them from the fully outwardly angulated attitude as in FIG. 8 to a less angulated attitude shown in FIG. 9. As a consequence, the outside edge 34 of the tabs wedge or bite into the inside rim 35 of spacer 15 to thereby force the spacer tightly against the face of pole 16. Because the tabs are pushed toward the plane of the poles from which they are pierced, their outside edges 34 bite into and push the spacer ring tightly against the pole and as soundly as if the two parts were otherwise bonded together. In addition to the advantages of bonding, the tabs also add support to the external spacer ring.

Figure 11:
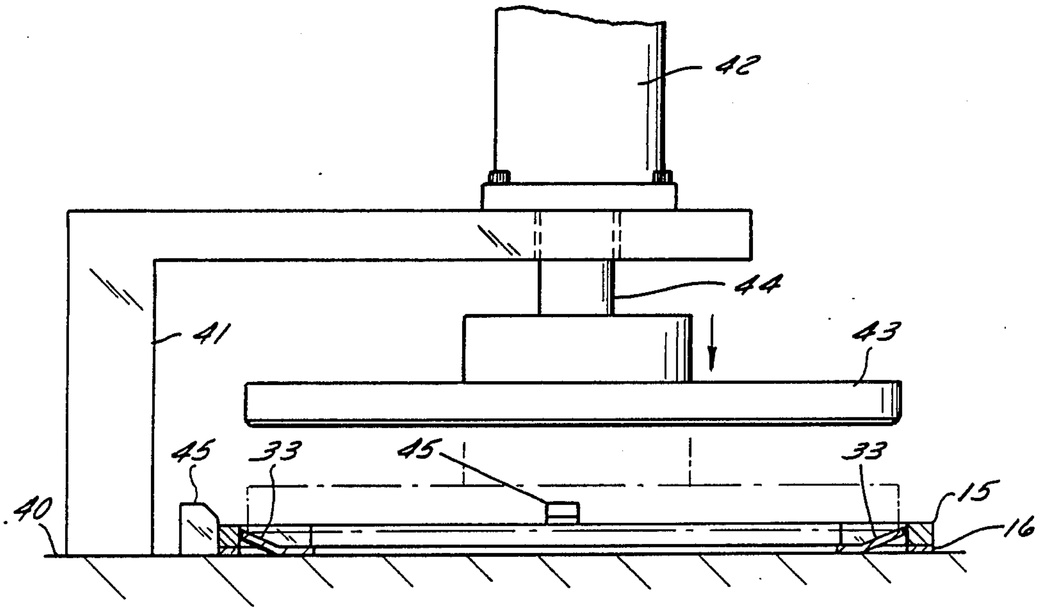
FIG. 11 is a symbolic representation of a press which is being operated to press and deflect the pole tabs to cause the latter to bite or wedge into a spacer for fastening it to a pole.

The symbolic representation of the press for acting on the tabs 33 in FIG. 11 comprises a base or anvil 40 and a frame 41 to which a hydraulic work cylinder 42 is mounted. A die head 43 is attached to the ram 44 of the hydraulic cylinder. The die head 43 has a diameter such that it can be pressed down onto the tabs 33 as shown in phantom lines so that all of the tabs 33 are pressed at the same time into wedging relation with the inside rim of the spacer 15.

Figure 6:
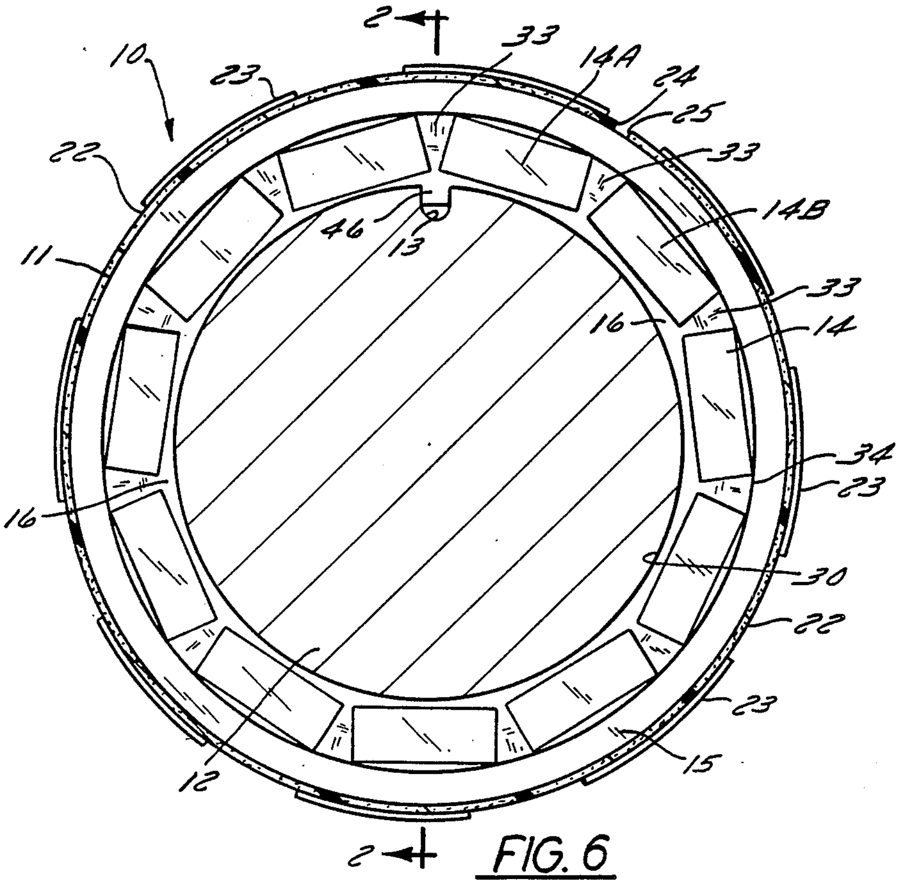
FIG. 6 is a sectional view taken transversely of the axis of the cylinder depicted in FIG. 1, showing a disk-like apertured pole mounted on a central core or shaft with the spacer ring fastened to the pole to establish the boundaries of a circular array of permanent magnets which develop the attractive force for holding a magnetizable flexible printing or die plate to the periphery of the magnetic cylinder.
Figure 7:
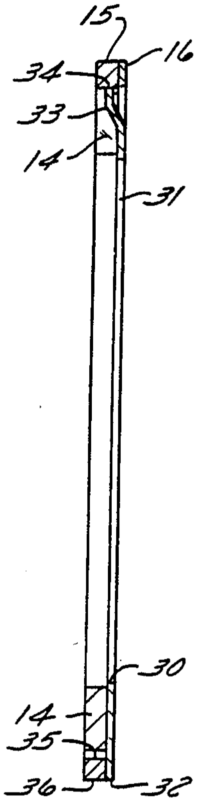
FIG. 7 is a cross section through a subassembly comprised of an apertured pole disk to which a spacer is fastened by the wedging action obtained by pressing tabs toward the plane of the pole from which they are punched initially.

Attention is now invited to FIG. 6 which shows how the magnets 14 are positioned on the face of pole 16 from which the tabs 33 are deflected. It will be evident that the magnets 14 are fitted in between circumferentially adjacent pairs of tabs 33. The magnets 14 are applied to each pole 16 after the spacer 15 has been secured by pressing and bending the tabs 33 as shown in FIGS. 7 and 9 subassemblies. Then the subassemblies are stacked on a shaft, core or mandrel 12 and clamped together as was previously discussed in reference to FIG. 1. In accordance with the invention, the internal diameter of the pole pieces 16 is slightly smaller than the external diameter of the shaft or mandrel, thus producing an interference type of fit. This interference fit is superior to other designs where a loose or slip fit is employed because the interference fit eliminates the pole piece radial shifting problem mentioned earlier. After the disks are pressed on the shaft, preferably epoxy resin is applied to the magnets to assure they will not shift or rattle when the cylinder rotates. The core 12, shown in FIG. 6, has an axially extending keyway 13 milled in it and there is a prong 46 extending radially inwardly from the inside circumference 30 of pole 16 to register in the keyway, not only to assure that the magnetic assembly will be driven positively by the rotationally driven core 12 but also to prevent rotation of the poles and to assure that corresponding magnets from pole to pole are congruent so as to form parallel axially extending rows of magnets near the periphery of the cylinder as shown in FIG. 6. In this figure, a flexible magnetizable plate 22 having cutting dies 23 formed on it is fastened to the cylinder by magnetic attraction.

As explained earlier, in prior art cylinder designs the tendency of the edges of the flexible plate to break away from the cylinder due to high bending stresses in the plate was overcome by using unduly strong and costly state-of-the-art magnets everywhere in the cylinder. According to the invention, only one axially extending row of extra strong magnets 14 needs to be used to hold the end regions of the plate 16 adjacent its edges in many cases where the radius of the plate is relatively large so bending stresses are moderate. In other cases where bending stresses in the plate are high, two axially extending congruent magnets 14A and 14B of strong state-of-the-art magnets are used. They reside on each side of the gap formed between the edges 24 and 25 of flexible plate 22. It has been discovered that having at least one row of extra strong magnets under the edges 24 and 25 of the plate or two rows of maximum strength magnets 14A and 14B where bending stress is assumed to be high as in FIG. 6 is all that is needed to assure that the ends or edges 24 and 25 do not tend to peel away from the peripheral surface of the magnetic cylinder. In some cases where stresses are exceedingly high three or possibly more rows of the extra strong magnets could conceivably be needed. All of the other magnets can have lesser strength and, of course, they are much less expensive than the extra strong magnets 14A and 14B, for example, used in the two circumferentially adjacent rows under the end portions of the plate. An axial line, not shown, is scribed on the polished cylinder surface to indicate the location of a row of strong magnets. Those who regularly use or design magnetic cylinders will be able to implement the indexing or positioning of the flexible plate on the magnetic cylinder easily.

By way of example, and not limitation, the weaker most generally used or majority of rows of magnets used in an actual embodiment of the new magnetic cylinder are known as ceramic magnets. The stronger magnets are known as rare earth magnets and the rare earth element is usually neodymium. The cost of the stronger magnets is typically about twenty times the cost of the weaker magnets. In view of the large number of magnets used in a cylinder, it should be readily apparent that the cost of a magnetic cylinder can be greatly reduced if the higher cost magnets are used only in the row or rows extending along the gap between the free edges 24 and 25 of the flexible plate 22 as prescribed by the invention disclosed herein.

Figure 10:
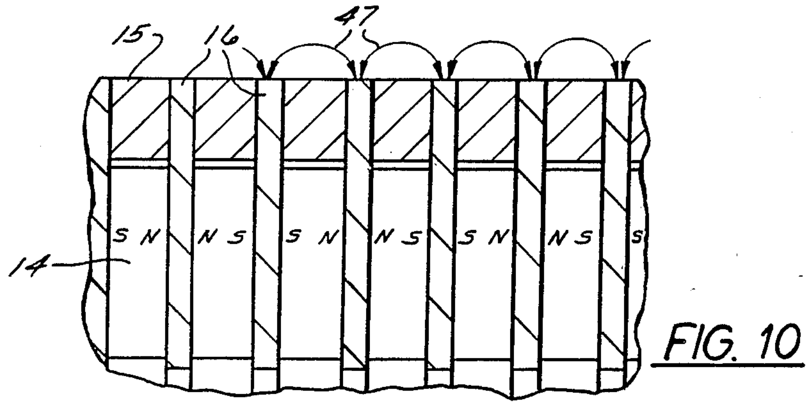
FIG. 10 is a section broken away from the cylinder and magnified compared to the other views to facilitate understanding of how the parts of the cylinder relate to each other.

FIG. 10 shows how the magnets are stacked in the assembled cylinder. Magnets 14 are polarized perpendicular to their faces. Thus, there is an alternation of pairs of north "N" poles on each side of one of the ferrous metal pole pieces 16 and pairs of south "S" poles on each side of the next pole 16 in the series. The magnetic flux or lines of force at the surface of the cylinder are indicated in FIG. 10 with curved lines marked 47.

Although a preferred embodiment of the invention has been described in detail, such description is intended to be illustrative rather than limiting, for the invention may be variously embodied and is to be limited only by interpretation of the claims which follow.

I claim:

1. A method of making parts for forming a magnetic cylinder including the steps of:

forming in circular disks of magnetically susceptible material, which have central apertures and opposite plane sides, a circular array of tabs which all diverge at an acute angle from one of the plane sides of each of the disks and have radially outwardly presented edges lying on a circle that is concentric to the disk, depositing a nonmagnetic spacer ring on the surface of each disk from which the tabs diverge such that the inside of the ring surrounds and is contiguous to said radially outwardly presented edges of the tabs, and pressing said tabs on each disk toward said one side of the disk such that said edges of the tabs wedge against the inside of the ring to fasten the ring concentrically to the disk.

2. The method according to claim 1 including the additional step of bonding said spacer rings to the disks by a method selected from the group of welding including electron beam, or laser welding, fusion, soldering, brazing or with an adhesive.

3. The method according to any one of claims 1 or 2 including the steps of:

placing permanent magnets on said disks between the tabs on each disk such that the north poles of the magnets on the disks interface with the side of the disk containing the tabs, and placing magnets on other of said disks such that the south poles of magnets interface with the side of the disk containing the tabs, stacking disks having the north poles of the magnets interfacing therewith alternately with the disks having the south poles of the magnets interfacing therewith to form a cylinder wherein the sides of the disks which have the tabs are presented toward the sides of the axially adjacent disks without tabs, corresponding magnets on each disk being aligned with each other to form a plurality of parallel axially extending circumferentially adjacent rows of magnets along the cylinder.

4. The method according to claim 3 wherein:

at least one magnet on each disk has greater magnetic strength than the majority of magnets placed on said disks, said disks being stacked in a manner such that greater strength magnets in corresponding positions on said disks are aligned axially with each other for at least one axially extending row of stronger magnets to be formed along said cylinder.

* * * * *